US012332519B2

(12) United States Patent
Ye et al.

(10) Patent No.: US 12,332,519 B2
(45) Date of Patent: Jun. 17, 2025

(54) BACKLIGHT UNIT AND COLOR FILTER ON ARRAY CONFIGURATION FOR A LIQUID CRYSTAL DISPLAY

(71) Applicant: Meta Platforms Technologies, LLC, Menlo Park, CA (US)

(72) Inventors: Shenglin Ye, Santa Clara, CA (US); Xinyu Zhu, San Jose, CA (US); Xiangtong Li, San Jose, CA (US); Yu-Jen Wang, San Jose, CA (US); Yun-Han Lee, Redmond, WA (US); Linghui Rao, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/613,563

(22) Filed: Mar. 22, 2024

(65) Prior Publication Data

US 2024/0345437 A1     Oct. 17, 2024

Related U.S. Application Data

(60) Provisional application No. 63/460,020, filed on Apr. 17, 2023.

(51) Int. Cl.
*G02F 1/13357* (2006.01)
*G02F 1/1335* (2006.01)
*G02F 1/1362* (2006.01)

(52) U.S. Cl.
CPC .. *G02F 1/133611* (2013.01); *G02F 1/133607* (2021.01); *G02F 1/136222* (2021.01); *G02F 1/136286* (2013.01)

(58) Field of Classification Search
CPC ............ G02F 1/1347; G02F 1/136222; G02F 1/133607; G02F 1/133611; G02F 1/136286; G02B 27/0172
See application file for complete search history.

(56) References Cited

U.S. PATENT DOCUMENTS

| 11,754,886 | B1 * | 9/2023 | Fan Jiang | G02F 1/136286 349/139 |
| 2009/0185385 | A1 * | 7/2009 | Shiau | G02B 6/0053 362/339 |
| 2014/0111862 | A1 * | 4/2014 | Yamamoto | B32B 27/281 427/164 |
| 2016/0266439 | A1 * | 9/2016 | Li | G02F 1/133603 |
| 2020/0379162 | A1 | 12/2020 | Chen et al. | |
| 2020/0393730 | A1 | 12/2020 | Okada et al. | |

(Continued)

FOREIGN PATENT DOCUMENTS

| JP | 2005191180 | * 7/2005 | H01L 21/027 |
| JP | 2022170475 A | * 11/2022 | |

OTHER PUBLICATIONS

European Search Report for European Patent Application No. 24167550.3, dated Sep. 12, 2024, 5 pages.

*Primary Examiner* — Jonathan Y Jung
(74) *Attorney, Agent, or Firm* — Greenberg Traurig, LLP

(57) ABSTRACT

A liquid crystal display (LCD) system for a head mounted display includes an LCD panel and a backlight unit. The LCD panel includes a color filter on array (COA) configuration. The backlight unit includes a light adjustment layer to adjust at least one characteristic of illumination light from a light source to tune the illumination light for enlarging an emission cone of display light.

18 Claims, 11 Drawing Sheets

(56) References Cited

U.S. PATENT DOCUMENTS

| | | |
|---|---|---|
| 2021/0294018 A1 | 9/2021 | Kanbayashi et al. |
| 2022/0076642 A1* | 3/2022 | Watanabe ............ G09G 3/3648 |
| 2022/0229331 A1* | 7/2022 | Hudman ........... G02F 1/133636 |

* cited by examiner

BACKLIGHT UNIT AND COLOR FILTER ON ARRAY CONFIGURATION FOR A LIQUID CRYSTAL DISPLAY

CROSS-REFERENCE TO RELATED APPLICATION

This application claims priority under 35 U.S.C. § 119(e) to U.S. Provisional Patent Application No. 63/460,020, entitled "INCREASING LCD BRIGHTNESS," filed on Apr. 17, 2023, which is hereby incorporated by reference in its entirety.

TECHNICAL FIELD

This disclosure relates generally to liquid crystal displays (LCDs), including but not limited to improving the brightness of LCDs.

BACKGROUND INFORMATION

LCDs are flat-panel displays that are widely used in both consumer and commercial contexts for displaying images. Typically, LCDs include an array of liquid crystal pixels that are illuminated by a backlight or side-illumination structure. The images are generated by modulating a voltage across each liquid crystal pixel to adjust the orientation of the liquid crystals in each pixel, and thus control the light output of the liquid crystal display. However, conventional LCDs have a number of disadvantages that cause them to operate inefficiently or ineffectively with respect to brightness or other performance requirement(s).

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Figure 1:
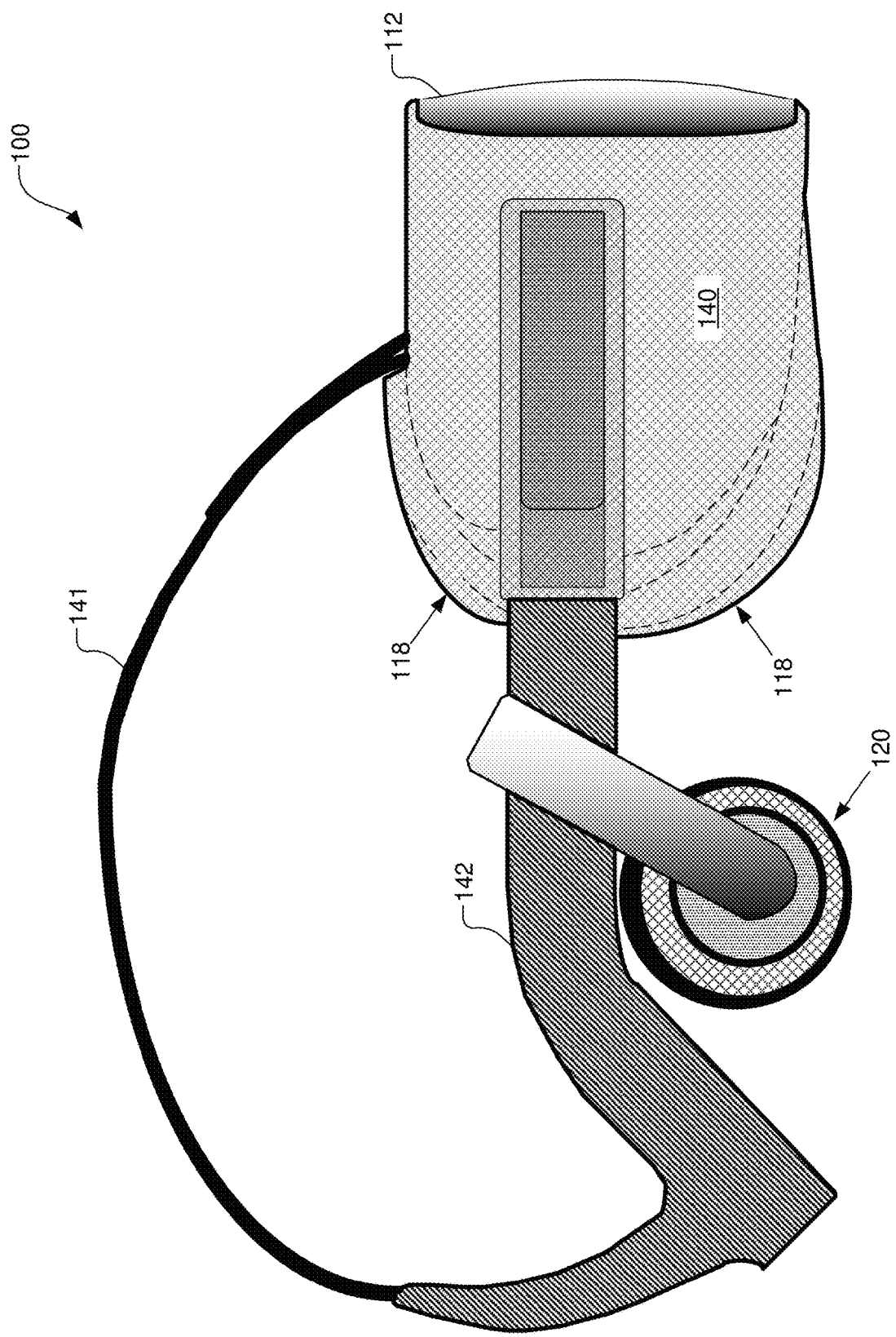
FIG. 1 illustrates an example head mounted display (HMD), in accordance with an embodiment of the disclosure.

Embodiments of a liquid crystal display (LCD) system with improved brightness and other advantageous features are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

An LCD system having an LCD panel and a high efficiency backlight unit (and their manner/method of operation) are described herein. The embodiments of the LCD system described in this disclosure may be provided for a head mounted display and provide increased in the brightness of the display light that is presented to a user of the head mounted display, as well as providing more efficient operation compared to conventional LCD system.

A conventional LCD may position color filters (e.g. red, green, and blue) above the liquid crystals material of the LCD panel so that display light along the optical path encounters the color filters after propagating through the liquid crystal layer. Components of the LCD (such as black matrix components or electrodes) therefore block a significant amount of the light and a narrower light emission cone is produced. This blockage of light and narrower emission cone result in the conventional LCD system having to utilize more power in order to achieve specific brightness requirements.

The embodiments described herein address this drawback utilizing an LCD with a color filter on array (COA) configuration that has display light propagating through the color filters prior to encountering the liquid crystals. The black matrix that defines individual pixels and electrodes may be co-located with the color filters in the COA configuration. This positioning of the black matrix, electrodes, and semiconductors for driving the pixels results in a wider emission cone, improved brightness, and more efficient power consumption of the LCD system.

Furthermore, the embodiments described herein enhance the efficiency of the backlight unit of the LCD system when paired with an LCD panel having a COA configuration. A light adjustment layer in the backlight unit is configured to adjust one or more characteristics of illumination light provided by a light source, such as a light emitting diode (LED). Adjusting the characteristic(s) of the illumination light enables adjusted illumination light to be tuned to the prism film layer(s) of the backlight unit.

These and other embodiments are described in more detail in connection with FIGS. 1-11.

FIG. 1 illustrates an example head mounted display (HMD) 100, in accordance with an embodiment of the disclosure. The HMD 100 includes a top structure 141 and a side structure 142 attached with a viewing structure 140. The illustrated HMD 100 is configured to be worn on a head of a user of the HMD 100. In one embodiment, the top structure 141 includes a fabric strap that may include elastic. The side structure 142 may include a fabric as well as rigid structures (e.g. plastics) for securing the HMD 100 to the head of the user (e.g., wearer). The HMD 100 may optionally include earpiece(s) 120 configured to deliver audio to the ear(s) of a wearer of the HMD 100.

In the illustrated embodiment, the viewing structure 140 includes an interface membrane 118 for contacting a face of a wearer of HMD 100. The interface membrane 118 may function to block out some or all ambient light from reaching the eyes of the wearer of the HMD 100.

The example HMD 100 also includes a chassis 112 for supporting hardware of the viewing structure 140 of the HMD 100. Hardware of the viewing structure 140 may include any of processing logic, wired and/or wireless data interface for sending and receiving data, graphic processors, and one or more memories for storing data and computer-executable instructions. In one embodiment, the viewing structure 140 may be configured to receive wired power. In one embodiment, the viewing structure 140 is configured to be powered by one or more batteries. In one embodiment, the viewing structure 140 may be configured to receive wired data including video data. In one embodiment, the viewing structure 140 is configured to receive wireless data including video data.

The viewing structure 140 may include an LCD, an organic light emitting diode (OLED) display, micro-LED display, quantum dot display, pico-projector, or liquid crystal on silicon (LCOS) display for directing image light to a wearer of HMD 100. The viewing structure 140 may include viewing optics (not illustrated in FIG. 1) to focus the image light for viewing by the user. Embodiments will be described herein in the context of the viewing structure 140 including an LCD (e.g., sometimes referred to as a "LCD panel") and related components.

Figure 2:
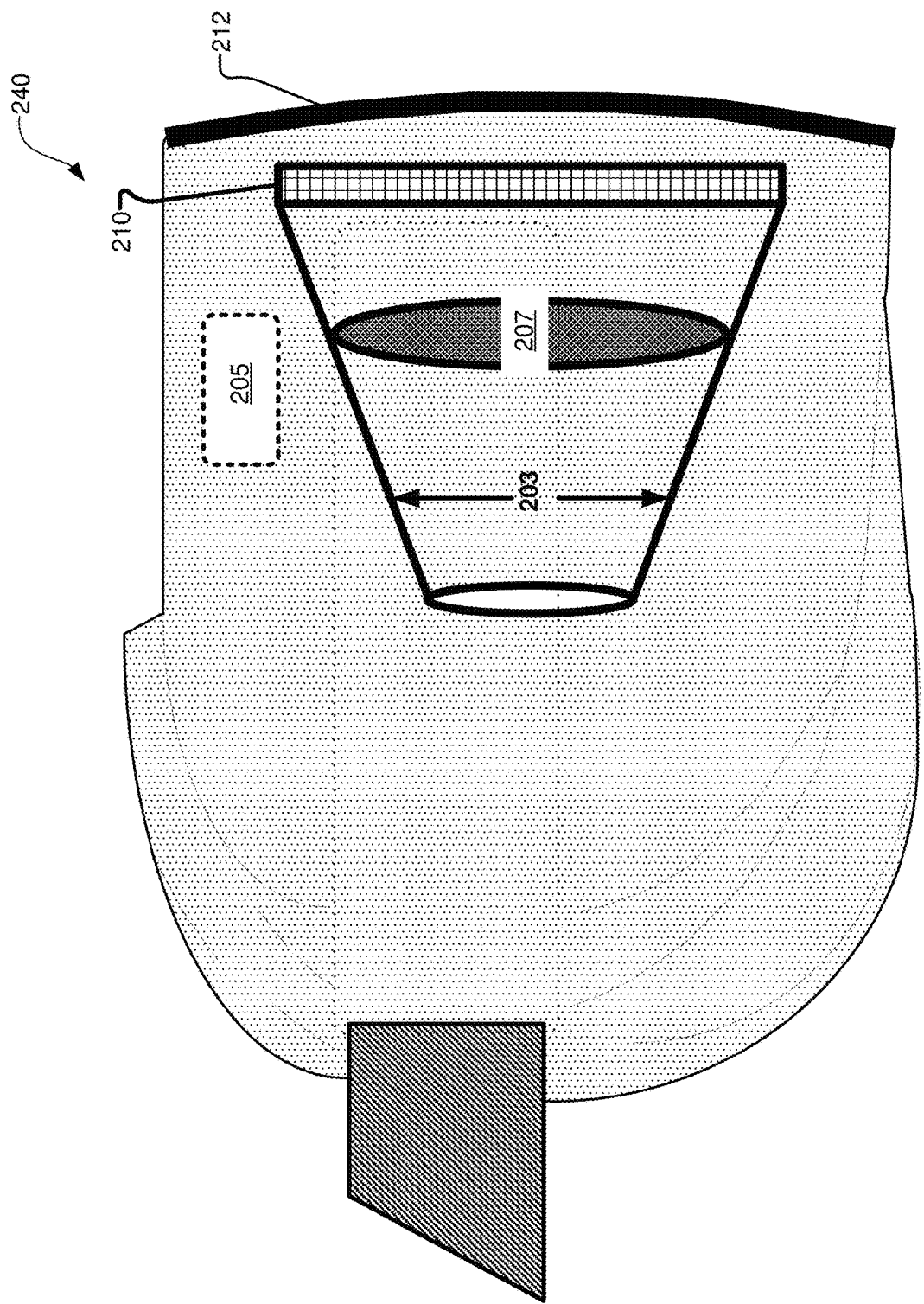
FIG. 2 illustrates an example viewing structure of an HMD that includes an LCD system, in accordance with an embodiment of the disclosure.

FIG. 2 illustrates an example viewing structure 240 of an HMD (such as the viewing structure 140 of the HMD 100 of FIG. 1) that includes an LCD system 210, in accordance with an embodiment of the disclosure. The LCD system 210 may include an LCD panel having liquid crystal material and other LCD-related components, a backlight unit (BLU), hardware and software, and other components and subcomponents to support operation of the LCD system 210. These various components of the LCD system 210 will be described in further detail later below.

The illustrated embodiment of the viewing structure 240 also includes an eye cup 203, viewing optics 207 (which may include one or more lenses configured to direct image light to an eyebox region of a user), and other components generally depicted at 205, such as a battery, one or more circuit boards such as a flexible circuit board (also known as a "flex circuit") and a mainboard, memory or other storage device(s), etc., which may be supported by and/or housed in a chassis 212 (e.g., the chassis 112 of the HMD 100 of FIG. 1). The mainboard may include one or more processors such as central processing units (CPUs) and/or graphics processing units (GPU). A flexible circuit board may be configured to deliver image signals (such as video data) from the mainboard for presentation by the LCD system 210 to the user as image light or display light (e.g., images), as well as delivering other signals to the LCD system 210 that are related to the control and operation of the LCD system 210 (such as signals to control operation of a BLU of the LCD system 210).

The eye cup 203 includes viewing optics 207 to focus display light generated by the LCD system 210 for the eye(s) of a wearer of the HMD that includes the viewing structure 240. For the sake of brevity, other components of the viewing structure 240 (as well as those of a HMD, such as the HMD 100) are not shown or described further herein—instead, the description hereinafter will be more specifically directed towards details regarding some of the components of an LCD system (such as the LCD system 210), including embodiments of an LCD panel and corresponding BLU.

Figure 3:
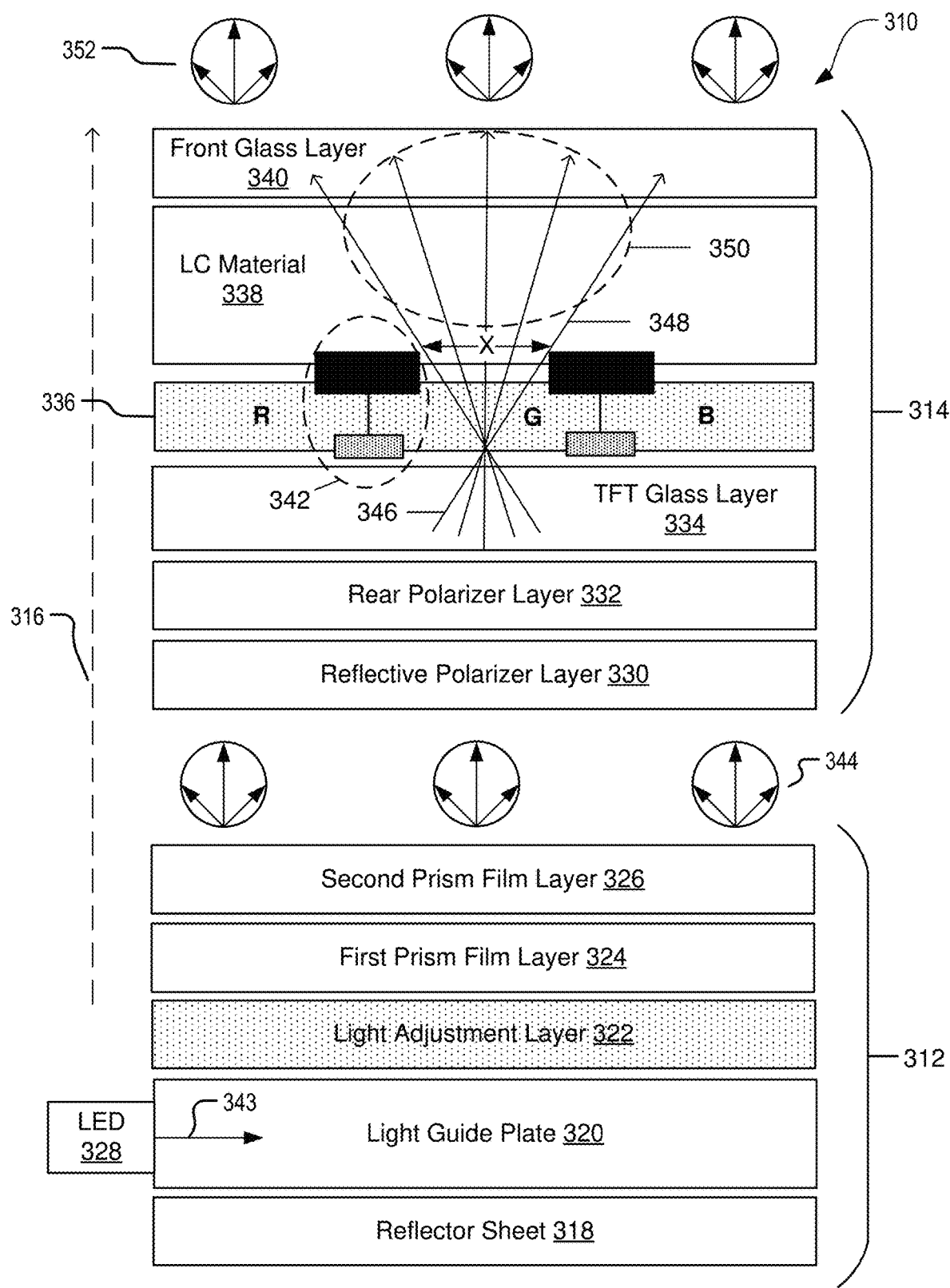
FIG. 3 illustrates an example LCD system, in accordance with aspects of the disclosure.

FIG. 3 illustrates an example LCD system 310, in accordance with aspects of the disclosure. The LCD system 310 may, for example, be implemented as the LCD system 210 in the viewing structure 240 of FIG. 2 for a HMD, such as the HMD 100. The LCD system 310 may include a BLU 312 and an LCD panel 314. The BLU 312 may be configured to provide light to the LCD panel 314, such that the light generally propagates, in the example of FIG. 3 for reference purposes, in the upward direction 316 from the bottom of the sheet towards the top of the sheet.

According to various embodiments and along the direction 316, the BLU 312 may include a reflector sheet 318, a light guide plate 320 disposed over the reflector sheet 318, a light adjustment layer 322 disposed over the light guide plate 320, and at least one prism film layer, such as a first prism film layer 324 disposed over the light adjustment layer 322 and a second prism film layer 326 disposed over the first prism film layer 324. In the example of FIG. 3, one or more illumination light sources (such as one or more light emitting diodes (LEDs) 328) is disposed on one side of the light guide plate 320.

According to various embodiments and along the direction 316, the LCD panel 314 may include at least one polarizer layer (such as a reflective polarizer layer 330 and a rear polarizer layer 332 disposed over the reflective polarizer layer 330), a thin-film transistor (TFT) glass layer 334 disposed over the rear polarizer layer 332, a color filter on array (COA) configuration 336 disposed over the TFT glass layer 334, liquid crystal (LC) material 338 disposed over the COA configuration 336, and a front glass layer 340 disposed over the LC material 338.

The LC material 338 may include liquid crystals that are arranged in one or more arrays, cells or pixels, or other configurations. The COA configuration 336 may include a plurality of individual color filters, with red (R), green (G), and blue (B) color filters being depicted in FIG. 3. These R-G-B color filters may in turn be isolated from each other by TFT electrodes and/or black matrix (BM) line components (collectively shown at 342).

It is understood that the specific arrangement and layers/components shown in the embodiment of FIG. 3 is just for example purposes. Other embodiments of the LCD system 310 can have other arrangements, fewer or additional components, etc. for the BLU 312 and the LCD panel 314, as compared to what is depicted in FIG. 3 and in other figures in this disclosure. Furthermore, the different forms of shading/hatching of some components, such as shown in FIG. 3 and in the other figures, are for purposes of more clearly identifying such components and are not intended to convey some type of specific material composition or structure of such components.

In operation, the LED 328 outputs illumination light 343 that is received by the light guide plate 320. The light guide plate 320 then directs the illumination light 343 to the light adjustment layer 322. According to various embodiments, the light adjustment layer 322 is configured to adjust one or more characteristics of the illumination light 343, such as the number of beams, the angular or propagational direction (e.g., collimate, focus, diffract, refract, reflect, etc.), beam/angular profile, and/or other characteristic of the illumination light 343, so that the adjusted illumination light is tuned for one or both of the prism film layers 324 and 326. The light that has undergone this adjustment (referred to herein as adjusted light) by the light adjustment layer 322 is then received by the first prism film layer 324 and afterwards by the second prism film layer 326. The prism film layers 324 and 326 are configured to output prism-prepared light 344 at certain defined angles.

The BLU 312 directs the prism-prepared light 344 to the LCD panel 314, or more particularly, directs the prism-prepared light 344 to the reflective polarizer layer 330 and the rear polarizer layer 332, both of which perform polarization operations on the prism-prepared light 344 (e.g., the reflective polarizer layer 330 may have a 90-degree transmission axis) so as to generate polarizer-prepared light 346.

The rear polarizer layer 332 directs the polarizer-prepared light 346 to the COA configuration 336, which performs filtering on the polarizer-prepared light 346 to generate filtered light 348. The filtered light 348 passes through one or more emission apertures X defined by adjacent TFT electrodes and/or BM line components 342, and into the LC material 338. The LC material 338 then outputs display light 352 (e.g., image light) to the eyes of the user.

In the example of FIG. 3, the COA configuration 336 is positioned between the LC material 338 and the BLU 312, or more specifically, the COA configuration 336 is disposed between the LC material 338 and the polarizer layers 330 and 332 such that the COA configuration 336 is spatially closer to the BLU 312. This arrangement has certain advantages over other LCD arrangements in which liquid crystals are disposed between color filters and the rear polarizer layers. In this LCD arrangement, the color filters are disposed over the LC material such that the color filters are spatially farther away from the BLU and so light passes through the LC material prior to propagating through the color filters.

Typically, the TFT electrodes and/or BM line components 342 obfuscate/block light. In the example arrangement of FIG. 3, the color filters, TFT electrodes, and BM lines of the COA configuration 336 are closer to the BLU 312 and thus emission aperture X (between adjacent TFT electrodes and/or BM line components 342) is located closer to BLU 312 and farther from front glass layer 340. By positioning this emission aperture X farther back in the optical system of LCD panel 314, the light emission cone 350 is widened and viewing angle of LCD panel 314 is improved. This may also increase the optical efficiency of the LCD panel 314. In effect, the light adjustment layer 322 is thus configured to more efficiently tune the adjusted light for enlarging the light emission cone 350 of the display light 352 that exits the emission aperture X through the color filters of the COA configuration 336.

In comparison and with respect to other types of arrangements in which color filters are placed above the LC material, the light emission cone for light output from the LC material would be smaller, due to the obfuscating effect of the TFT electrodes and/or BM line components positioned over the LC material. With this smaller/narrower emission cone, the LCD panel of these other arrangements would need to generate more power in order to achieve similar brightness performance as the arrangement of FIG. 3.

Figure 4:
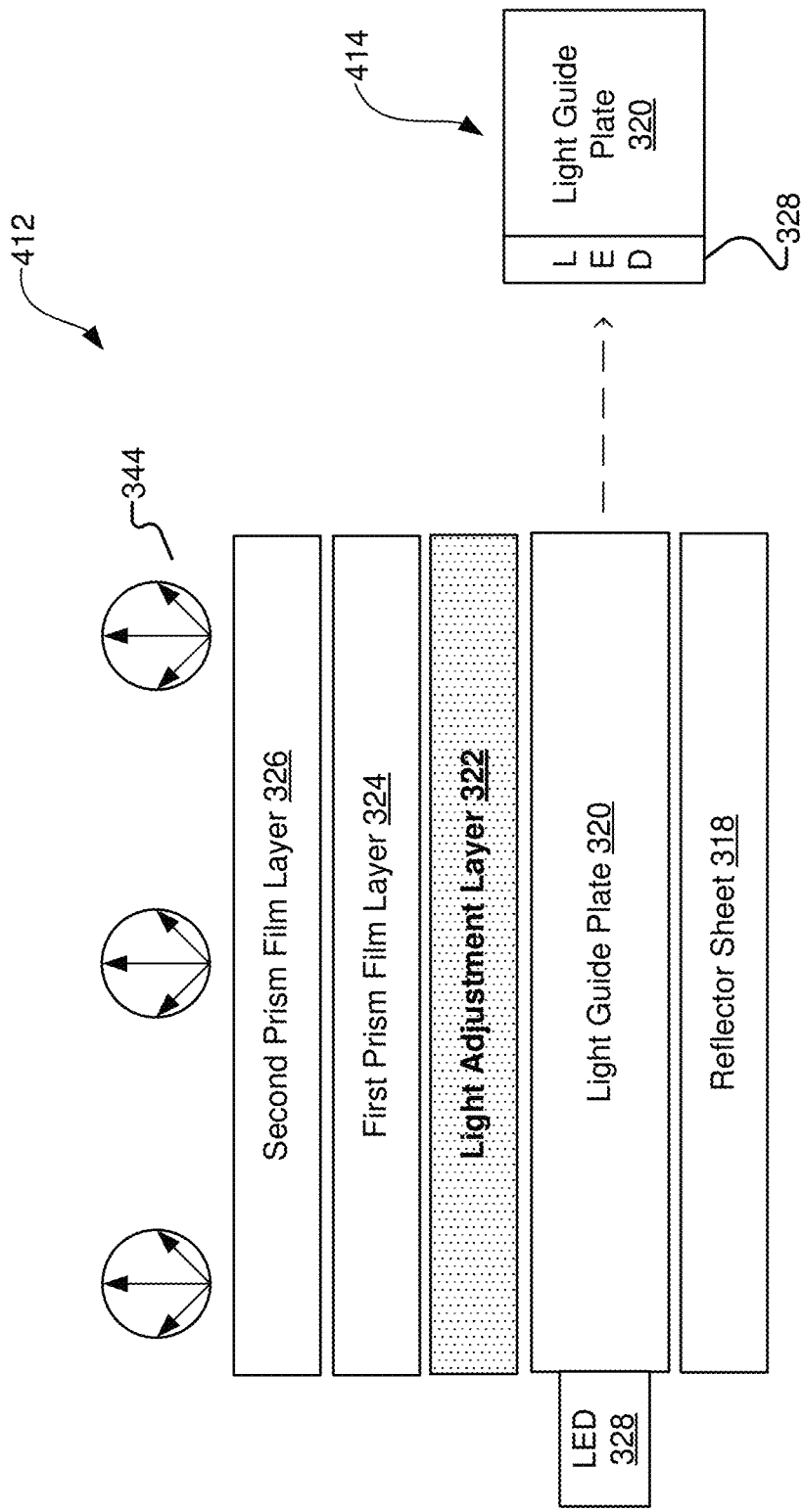
FIGS. 4-6 illustrate example backlight units (BLUs), in accordance with aspects of the disclosure.
Figure 5:
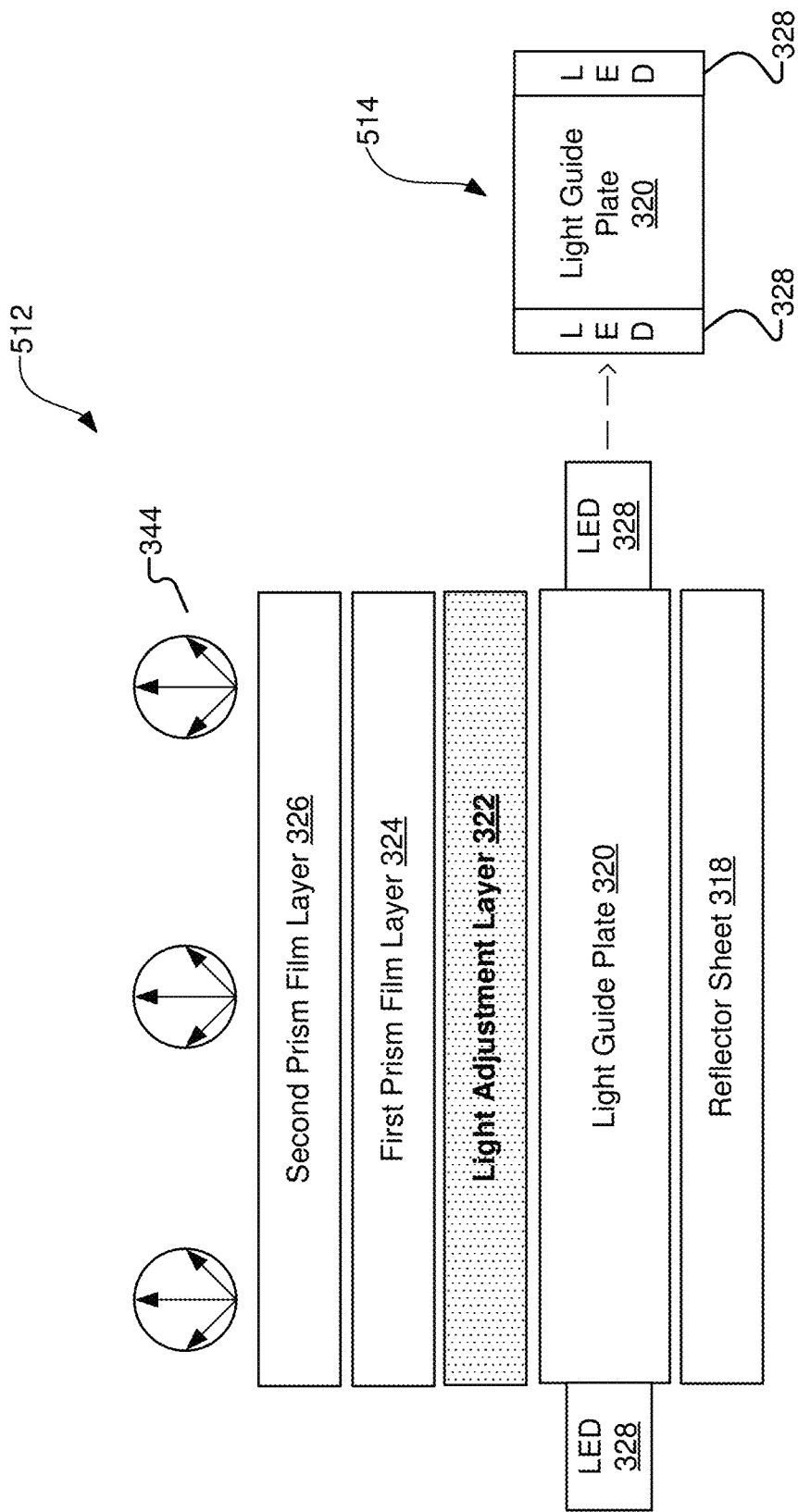
Figure 6:
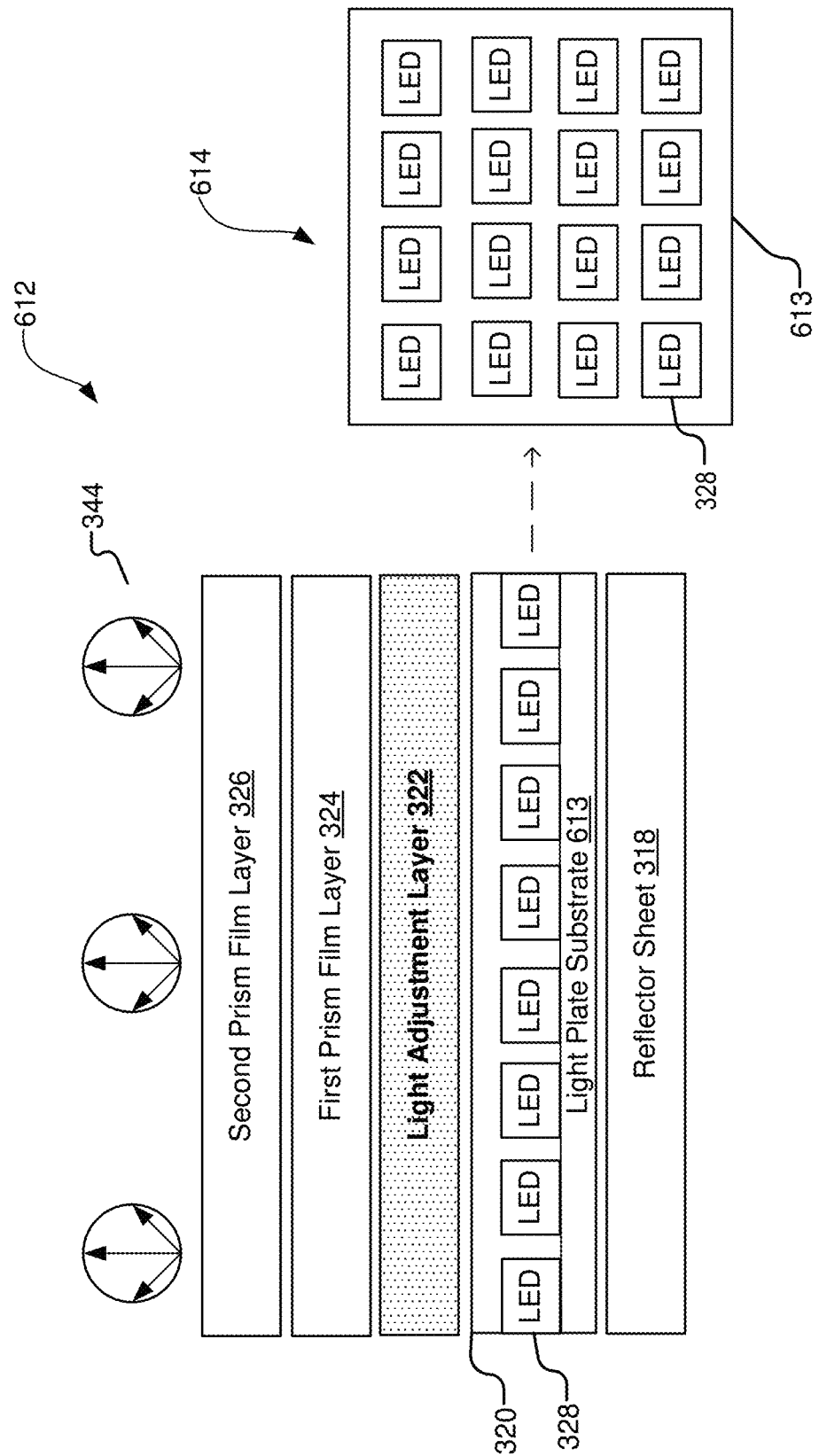

FIGS. 4-6 illustrate example backlight units (BLUs), in accordance with aspects of the disclosure. For instance, a BLU 412 in FIG. 4 may be used to implement the BLU 312 of FIG. 3, in which one or more LEDs 328 are disposed on one side of the light guide plate 320. As shown in an example configuration 414 (top view), the LEDs 328 may be disposed along part of or entirely the length of a single side of the light guide plate 320.

FIG. 5 illustrates another example BLU 512, in accordance with aspects of the disclosure. In FIG. 5, the example BLU 512 has LEDs 328 on a plurality (e.g., two or more) sides of the light guide plate 320. As shown in an example configuration 514 (top view), the LEDs 328 may be disposed along part of or entirely the length of two opposing sides of the light guide plate 320. In other embodiments, more than two sides of the light guide plate 320 may have LEDs 328 disposed thereon.

FIG. 6 illustrates still another example BLU 612, in accordance with aspects of the disclosure. In FIG. 6, the example BLU 612 has an array of LEDs 328 disposed on a substrate 613 of the light guide plate 320. As shown in an example configuration 614 (top view), the LEDs 328 may be arranged in a 2-dimensional array on the top surface of the substrate 613.

Figure 7:
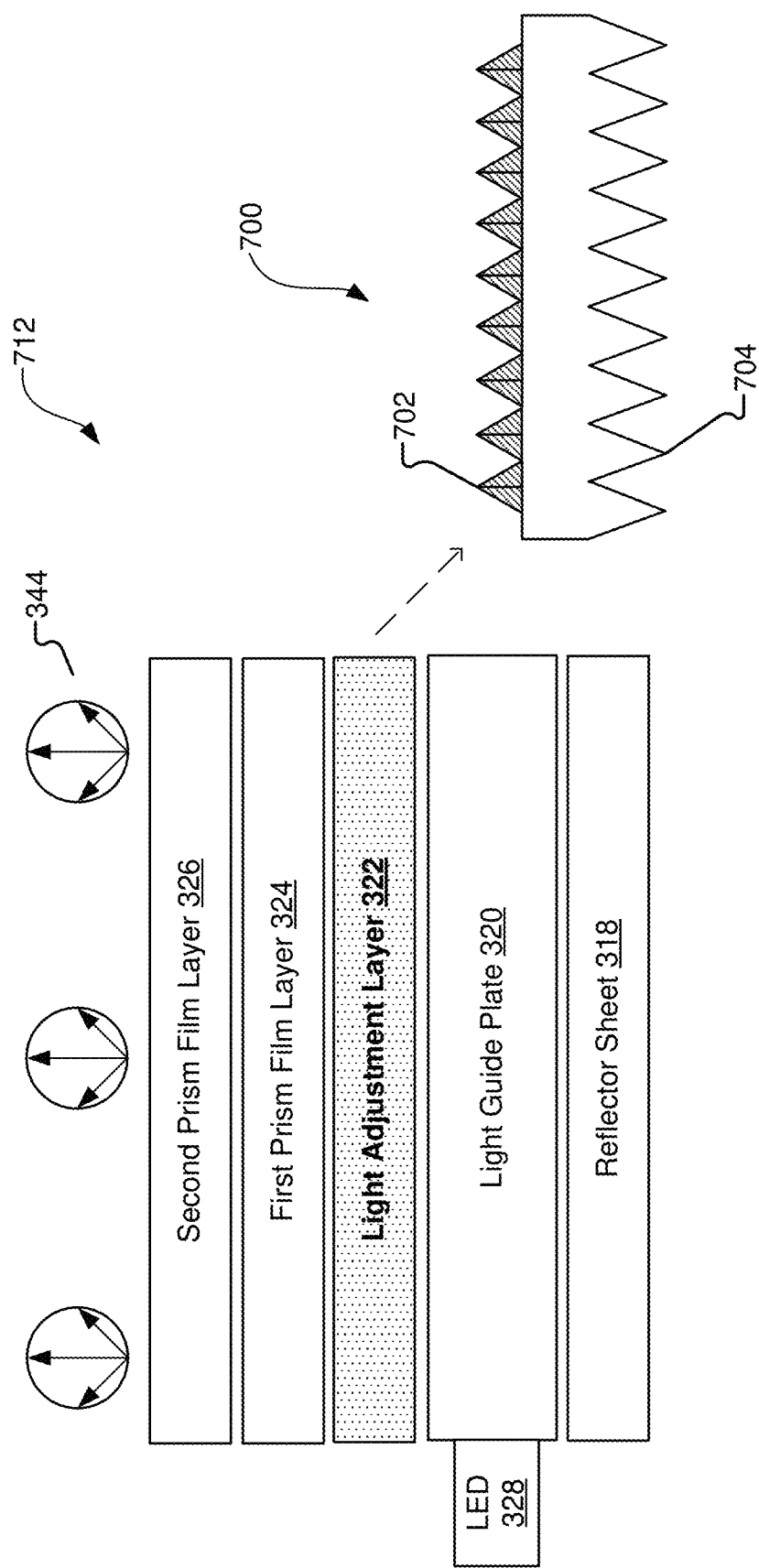
FIGS. 7-9 illustrate example light adjustment layers for a BLU, in accordance with aspects of the disclosure.
Figure 8:
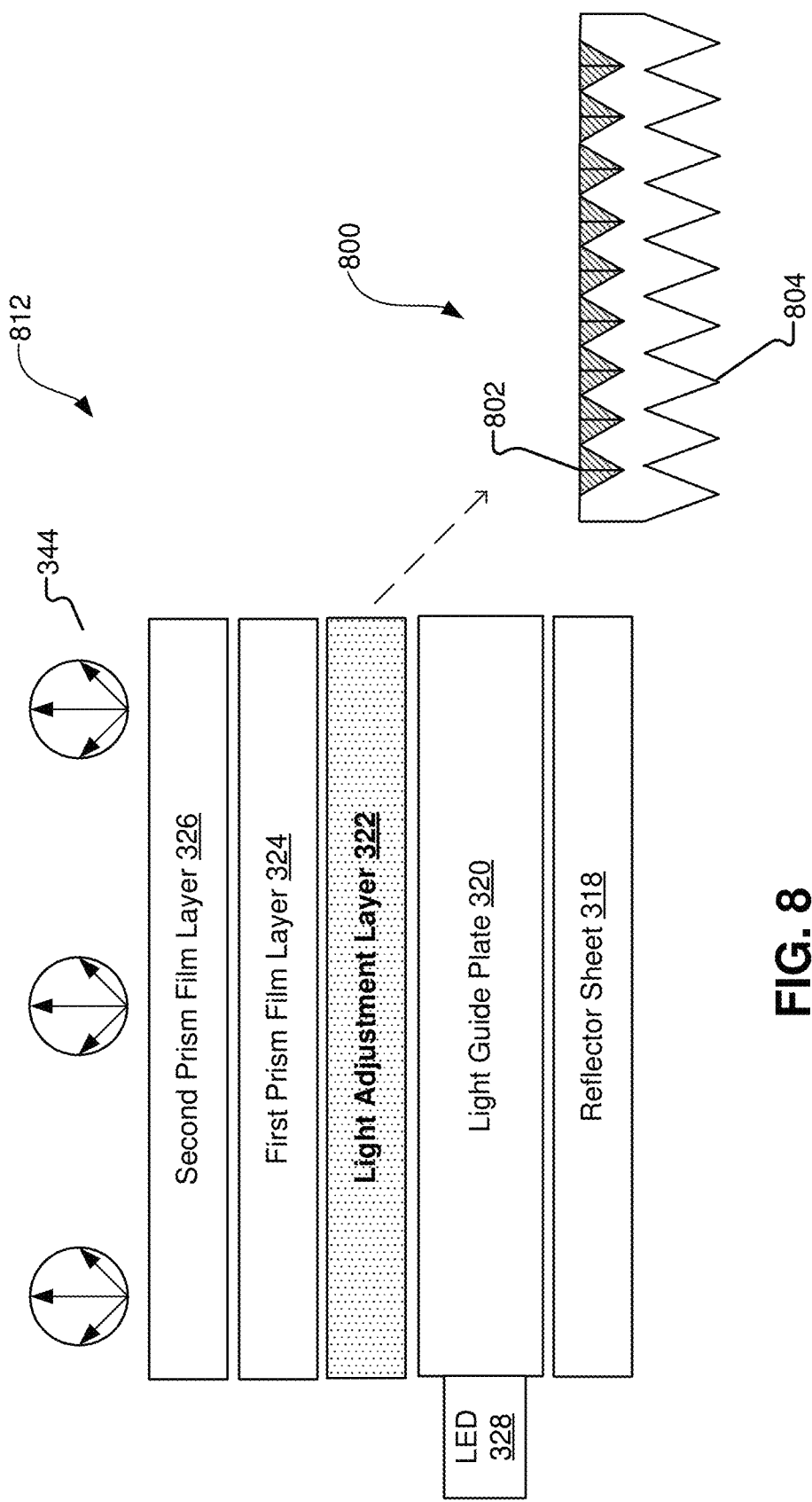
Figure 9:
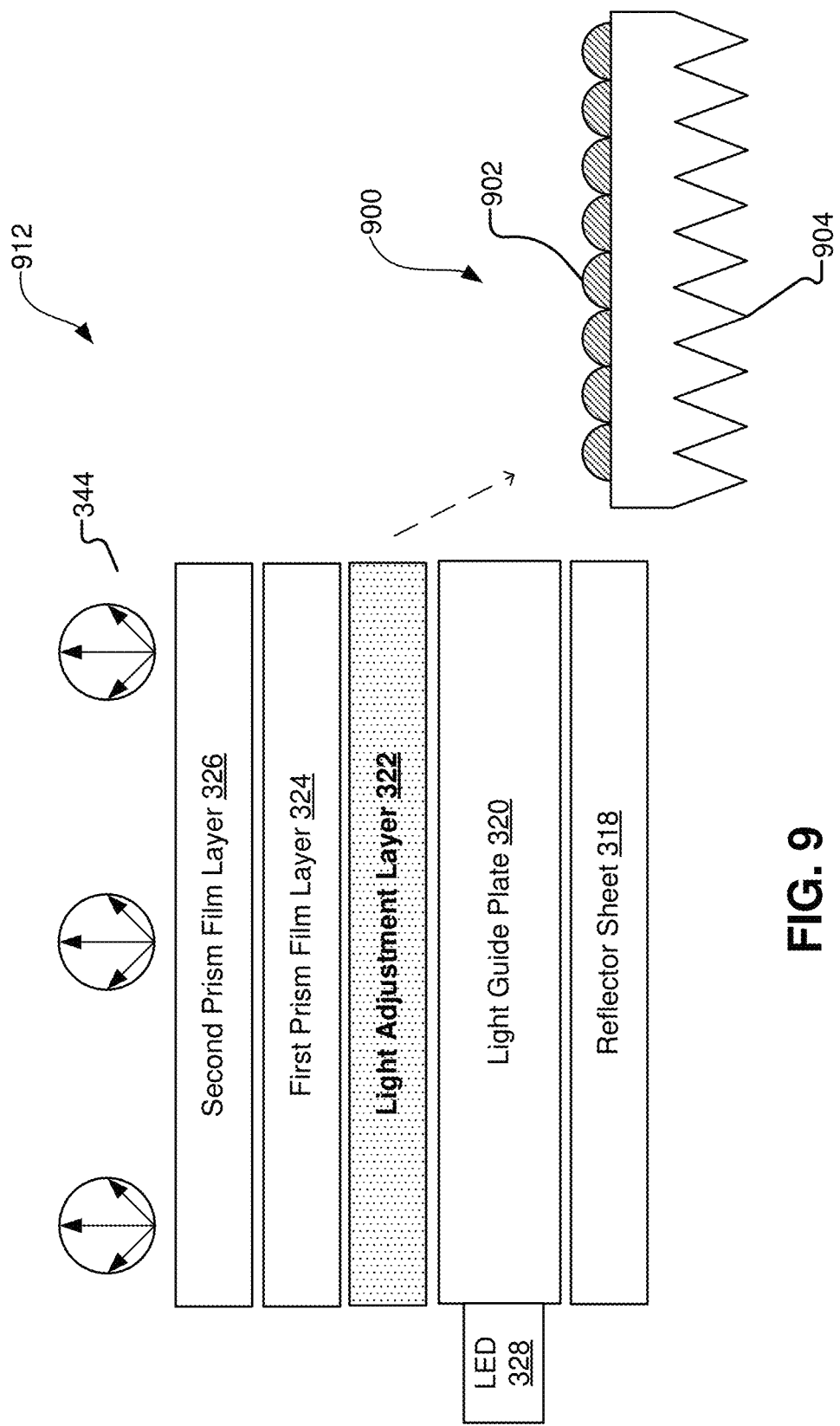

FIGS. 7-9 illustrate example light adjustment layers for a BLU, in accordance with aspects of the disclosure. For instance, a BLU 712 in FIG. 7 may be used to implement the BLU 312 of FIG. 3, wherein the light adjustment layer 322 is embodied by a prism-pyramid hybrid film 700. Such a hybrid film 700 includes microstructures in the form of pyramids 702 disposed over prisms 704. The pyramids 702 may be upward pointing towards the LCD panel 314 and may have four sides (facets), and the prisms 704 may be downward pointing away from the LCD panel 314 and may have two sides, as examples.

Any suitable number of sides/facets, orientations, positions, distributions, etc. for pyramids, prisms, or other microstructures may be provided in the films disclosed herein in order to achieve particular optical performance objectives. For example, and dependent on design requirements and goals, improvements in efficiency, brightness, etc. for the BLU 312 and/or the LCD panel 314 can be obtained if one or more of angular direction, shape/profile, or other characteristic of the light propagating through the BLU 312 and/or the LCD panel 314 is modified relative to the illumination light 343 that is output from the LED(s) 328. The pyramids and prisms may be made from ultraviolet (UV) resins having different refractive indices/properties, with index values being chosen in order to achieve particular optical performance objectives.

As an example, a beam of the illumination light 343 (shown in FIG. 3) may be output from the LED 328 and is incident (via the light guide plate 320) on one or more of the prisms 704. The prism 704 may adjust the beam by splitting the beam into two beams, and then the pyramid 702 may further adjust the beam by splitting each beam into four beams that propagate at particular angular directions for delivery to the prism film layers 324 and 326. The prism film layers 324 and 326 may thus operate more efficiently/ effectively by receiving light (output from the hybrid film 700) that is focused, directional, collimated, or has other desired characteristic(s) that is tuned to the prism film layers 324 and 326, as compared to conventional light guide plates that just generally diffuse light in uncontrolled directions.

As another example, the light adjustment layer 322 may be configured to change a beam profile of the illumination light. For instance, the illumination light 343 (from the light guide plate 320) may be at an angular (beam) profile of plus/minus 70 degrees. One or more of the prisms 704 may then adjust the angular profile from 70 degrees to plus/minus 55 degrees, and one or more of the pyramids 702 may subsequently adjust the angular profile from plus/minus 55 degrees to plus/minus 45 degrees for delivery to the prism film layers 324 and 326. Thus, the adjusted light output from the hybrid film 700 may have a narrower angular profile than the illumination light 343 from the LED 328 via the light guide plate 320. In some embodiments, such approximate and narrower angular profile values (and direction) for the adjusted light received by the prism film layers 324 and 326 enable the prism film layers 324 and 326 to operate more efficiently, as compared to wider or non-adjusted angular profiles.

Other configurations for the light adjustment layer 322 are possible, including both hybrid and non-hybrid film configurations. In the example configuration in FIG. 8, for the light adjustment layer 322, a hybrid film 800 (like the hybrid film 700 of FIG. 7) includes both pyramids 802 and prisms 804. However, the pyramids 802 are downward pointing away from the LCD panel 314, thereby providing a prism-waffle hybrid film configuration. With such a configuration, the hybrid film 800 of FIG. 8 would thus have different optical properties compared to the hybrid film 700 of FIG. 7.

Another example (not shown) of a hybrid film configuration may include a pyramid-prism film configuration, in which the pyramids are pointed towards and facing the light guide plate 320, and the prisms are facing the prism film layers 324 and 326. Hence, such a configuration has "swapped" microstructures positions relative to what is depicted in FIGS. 7 and 8. Examples of non-hybrid film configurations (not shown) may include prism-prism film configurations and pyramid-pyramid film configurations.

As still another example for the light adjustment layer 322, a hybrid film 900 of FIG. 9 has a prism-microlens configuration that includes both microlenses 902 and prisms 904. The microlenses 902 may have their convex surfaces facing upwards towards the LCD panel 314. With such a prism-microlens configuration, the light output from the microlenses 902 is less directional than light output from pyramids (such as shown in FIGS. 7 and 8). The less directional light may be useful for embodiments that do not require a more directional or narrower profile (e.g., do not require a profile of plus/minus 45 degrees) for light provided to the prism film layers 324 and 326.

Additional techniques can be used to further adjust light for improved performance of the BLU 312 and LCD panel 314, and such techniques can be combined with the previous techniques described above with respect to the positioning of the COA configuration 336 in the LCD panel 314 and the use of the light adjustment layer 322 in the BLU 312. For instance, FIG. 10 illustrates an example LCD panel 1014, in accordance with aspects of the disclosure.

Figure 10:
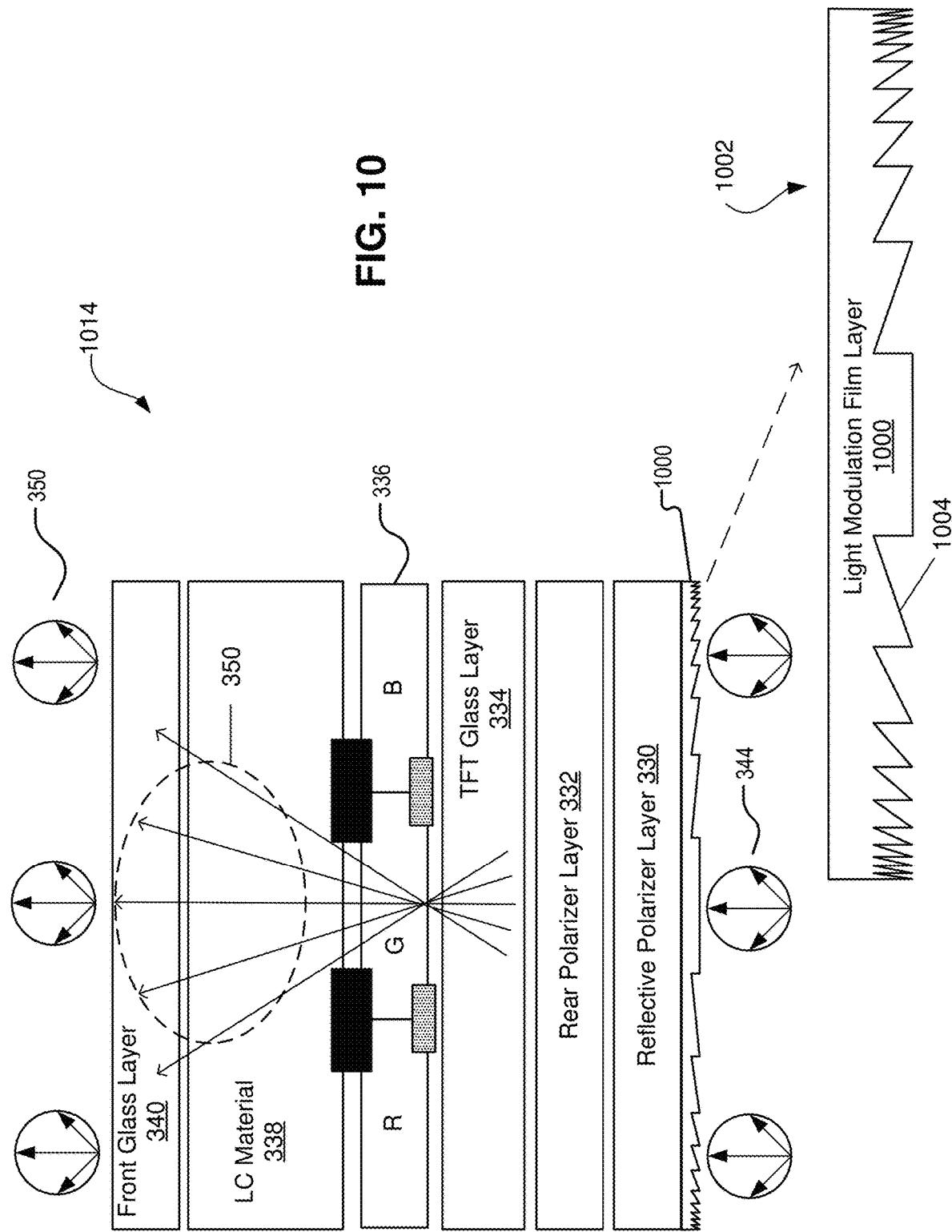
FIG. 10 illustrates an example LCD panel, in accordance with aspects of the disclosure.

The LCD panel 1014 of FIG. 10 may be used to implement the LCD panel 314 of FIG. 3. Similar/same components in FIG. 10 are numbered the same as those in FIG. 3. However, one difference is that the embodiment of the LCD panel 1014 of FIG. 10 includes a light modulation film layer 1000 disposed underneath the reflective polarizer layer 330 (e.g., the light modulation film layer 1000 is positioned before the reflective polarizer layer 330 in the optical path for the prism-prepared light 344).

An enlarged view of the light modulation film layer 1000 is shown at 1002. According to various embodiments, the prism-prepared light 344 is incident on a surface 1004 of the light modulation film layer 1000. The surface 1004 may have a non-planar profile, for example a surface profile that includes, but is not limited to, prisms, a curved surface with spherical and/or aspherical shape, microlenses, axicon shapes, or other microstructures profiles/shapes.

In accordance with various embodiments, the surface 1004 of the light modulation film layer 1000 is configured to operate on the prism-prepared light 344 incident on the surface 1004, so as to change the angular profile of the display light 352 viewed by the user, for example by steering the angular profile more towards the edges of a lens. In an embodiment, light modulation film layer 1000 is configured to increase the emission angle of display light along edges of display panel 1014. Changing the angular profile may be advantageous in some embodiments depending on the lens arrangement of an HMD or other properties of the viewing optics 207 (shown in FIG. 2), with respect to improving the visibility of the images being viewed through the lens. Furthermore, the surface 1004 may be modified from one implementation to another to account for changes in the lens, thereby enabling the LCD panel 1014 to be tuned to a particular lens.

Figure 11:
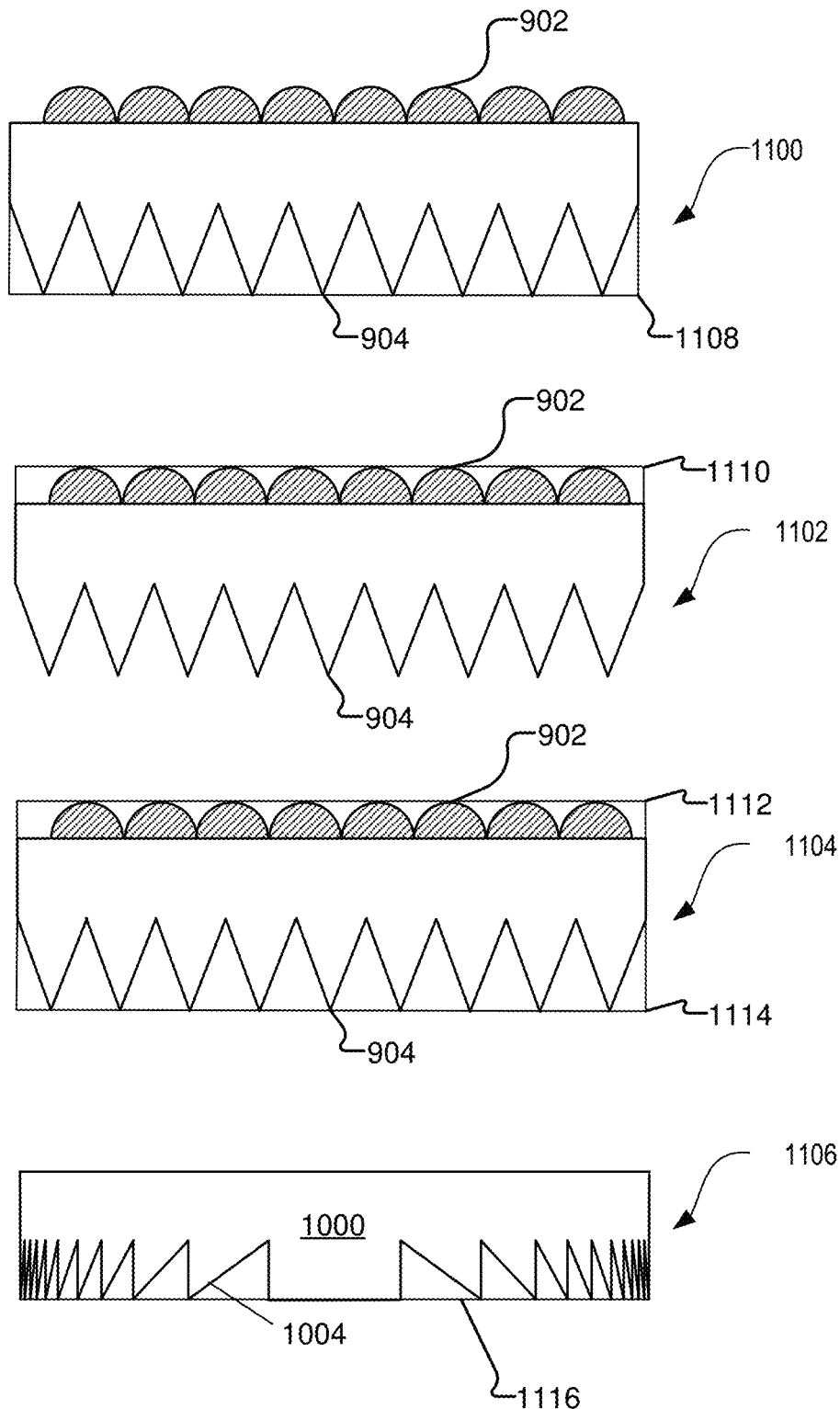
FIG. 11 illustrates example layer configurations, in accordance with aspects of the disclosure.

FIG. 11 illustrates example layer configurations, in accordance with aspects of the disclosure. More particularly, FIG. 11 illustrates the use of a lower refractive index filler material (e.g., a material having a lower refractive index relative to the refractive index of the adjacent film/layer microstructures) to fill in the air gaps between the adjacent microstructures. This filling in of the air gaps is advantageous, for example, to reduce Fresnel refraction losses. In an embodiment, the refractive index of the filler material is above 1.5. In an embodiment, the refractive index of the filler material is above 1.6.

In the configurations 1100-1104, the filler material is applied to prism-microlens hybrid films. For the configuration 1100, filler material 1108 is disposed between the prisms 904 but not between the microlenses 902. For the configuration 1102, filler material 1110 is disposed between the microlenses 902 but not between the prisms 904. For the configuration 1104, filler material 1112 is disposed between the microlenses 902 and filler material 1114 is also disposed between the prisms 904.

The configuration 1106 illustrates filler material 1116 disposed on the profile of the surface 1004 of the light modulation film layer 1000. Thus, the air gaps in the profile of the surface 1004 are reduced or removed (filled in) by the filler material 1116.

Embodiments may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" in this disclosure may include one or more processors, microprocessors, multi-core processors, application-specific integrated circuits (ASIC), and/or field programmable gate arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A network usable with the embodiments described herein may include any network or network system such as, but not limited to, the following: a peer-to-peer network; a local area network (LAN); a wide area network (WAN); a public network, such as the Internet; a private network; a cellular network; a wireless network; a wired network; a wireless and wired combination network; and a satellite network.

Communication channels usable with the embodiments described herein may include or be routed through one or more wired or wireless communication utilizing IEEE 802.11 protocols, short-range wireless protocols, serial peripheral interface (SPI), inter-integrated circuit ($I^2C$), universal serial bus (USB), (controller area network (CAN), cellular data protocols (e.g. 3G, 4G, LTE, 5G), optical communication networks, internet service providers (ISPs), a peer-to-peer network, a local area network (LAN), a wide area network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments, including what is described in the Abstract, is not intended to be exhaustive or to limit the invention to the precise forms disclosed. While specific embodiments and examples are described herein for illustrative purposes, various modifications are possible within the scope of this disclosure, as those skilled in the relevant art will recognize.

These modifications can be made in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A head mounted display comprising:
   a liquid crystal display (LCD) panel having a color filter on array (COA) configuration, wherein the LCD panel is configured to generate display light, wherein the COA configuration includes electrodes separately facing black matrix lines that effectively define an emission aperture through color filters of the COA configuration; and
   a backlight unit including:
     a light source configured to emit illumination light;
     at least one prism film layer; and
     a light adjustment layer configured to receive the illumination light emitted by the light source and to adjust at least one characteristic of the illumination light to generate adjusted light to provide to the at least one prism film layer, wherein the adjusted light is tuned relative to the at least one prism film layer, and wherein the at least one prism film layer is configured to generate prism-prepared light in response to the adjusted light and to provide the prism-prepared light to the LCD panel for generation of the display light in response to the prism-prepared light, wherein the light adjustment layer is configured to tune the adjusted light for enlarging an emission cone of the display light that exits the emission aperture through the color filters of the COA configuration.

2. The head mounted display of claim 1, wherein the light adjustment layer includes microstructures configured in one or more of: a prism-microlens hybrid film.

3. The head mounted display of claim 2, wherein the light adjustment layer further includes filler material that fills air gaps between the microstructures, and wherein the filler material has a lower refractive index relative to a refractive index of the microstructures.

4. The head mounted display of claim 1, wherein the LCD panel further includes a light modulation film layer disposed between the COA configuration and the backlight unit, wherein the light modulation film layer is configured to receive the prism-prepared light from the backlight unit and configured to operate on the prism- prepared light to steer an angular profile of the display light towards edges of a lens of the head mounted display.

5. The head mounted display of claim 1, wherein the light adjustment layer includes a prism microlens hybrid film that includes a filler material that fills air gaps between microlenses in the prism microlens hybrid film, and wherein the filler material has a lower refractive index relative to a refractive index of the microlens.

6. The head mounted display of claim 5, wherein the prism microlens hybrid film includes a second filler material that fills air gaps between prisms of the prism microlens hybrid film that are disposed on an opposite side of the prism microlens hybrid film than the microlenses of the prism microlens hybrid film, and wherein the second filler material has a lower refractive index relative to a refractive index of the prisms.

7. The head mounted display of claim 5, wherein the lower refractive index of the filler material is above 1.6.

8. A backlight unit for a liquid crystal display (LCD) panel, the backlight unit comprising:
   at least one light source configured to emit illumination light;
   at least one prism film layer including a prism microlens hybrid film that includes a filler material that fills air gaps between microlenses in the prism microlens hybrid film, and wherein the filler material has a lower refractive index relative to a refractive index of the microlens; and
   a light adjustment layer configured to receive the illumination light emitted by the at least one light source and to adjust at least one characteristic of the illumination light to generate adjusted light to provide to the at least one prism film layer, wherein the adjusted light is tuned relative to the at least one prism film layer, and wherein the at least one prism film layer is configured to generate prism-prepared light in response to the adjusted light and to provide the prism-prepared light to the LCD panel.

9. The backlight unit of claim 8, wherein the prism microlens hybrid film includes a second filler material that fills air gaps between prisms of the prism microlens hybrid film that are disposed on an opposite side of the prism microlens hybrid film than the microlenses of the prism microlens hybrid film, and wherein the second filler material has a lower refractive index relative to a refractive index of the prisms.

10. The backlight unit of claim 8, wherein the lower refractive index of the filler material is above 1.6.

11. A liquid crystal display (LCD) system for a head mounted display, the LCD system comprising:

an LCD panel having a color on filter array (COA) configuration and liquid crystal material, and configured to generate display light, wherein the COA configuration includes electrodes separately facing black matrix lines that effectively define an emission aperture through color filters of the COA configuration; and
a backlight unit, wherein the COA configuration is disposed between the liquid crystal material and the backlight unit, and wherein the backlight unit includes:
   a light source configured to emit illumination light;
   at least one prism film layer; and
   a light adjustment layer configured to receive the illumination light emitted by the light source and to adjust at least one characteristic of the illumination light to generate adjusted light that is tuned to the at least one prism film layer, and wherein the at least one prism film layer is configured to generate prism-prepared light in response to the adjusted light and to provide the prism-prepared light to the LCD panel for generation of the display light in response to the prism-prepared light.

12. The LCD system of claim 11, wherein the light adjustment layer includes microstructures configured in a hybrid film having different types of microstructures or in a non-hybrid film having a same type of microstructure.

13. The LCD system of claim 12, wherein the hybrid and non-hybrid films includes: a prism-pyramid hybrid film or a pyramid-prism hybrid film.

14. The LCD system of claim 12, wherein the light adjustment layer further includes filler material that fills air gaps between the microstructures, and wherein the filler material has a lower refractive index relative to a refractive index of the microstructures.

15. The LCD system of claim 11, wherein the adjusted at least one characteristic of the illumination light includes one or more of: angular direction or angular profile of the illumination light.

16. The LCD system of claim 11, wherein the light adjustment layer includes a light modification film with an axicon surface and a filler material that fills air gaps in the axicon surface, and wherein the filler material has a lower refractive index relative to the light modification film.

17. The LCD system of claim 11, wherein the light adjustment layer includes a light modification film with an aspherical surface and a filler material that fills air gaps in the aspherical surface, and wherein the filler material has a lower refractive index relative to the light modification film.

18. The LCD system of claim 11, wherein the electrodes and the black matrix lines are disposed between the backlight unit and liquid crystal material of pixels of the LCD panel.

* * * * *